United States Patent
Chen et al.

(10) Patent No.: US 10,289,658 B1
(45) Date of Patent: May 14, 2019

(54) WEB PAGE DESIGN SCANNER

(71) Applicant: CA, Inc., Islandia, NY (US)

(72) Inventors: Daocheng Chen, Beijing (CN); Shouhong Zhang, Beijing (CN)

(73) Assignee: CA, Inc., Islandia, NY (US)

( * ) Notice: Subject to any disclaimer, the term of this patent is extended or adjusted under 35 U.S.C. 154(b) by 435 days.

(21) Appl. No.: 13/800,154

(22) Filed: Mar. 13, 2013

(51) Int. Cl.
*G06F 17/22* (2006.01)

(52) U.S. Cl.
CPC .................. *G06F 17/2247* (2013.01)

(58) Field of Classification Search
CPC ..................................... G06F 17/248
USPC ......................... 715/235, 234, 243
See application file for complete search history.

(56) References Cited

U.S. PATENT DOCUMENTS

| | | | |
|---|---|---|---|
| 8,869,049 B1 * | 10/2014 | Li ...................... | G06F 3/0481 715/705 |
| 9,087,035 B1 * | 7/2015 | Bandaru ............. | G06F 17/248 |
| 2004/0046787 A1 | 3/2004 | Henry et al. | |
| 2005/0044197 A1 | 2/2005 | Lai | |
| 2006/0253345 A1 * | 11/2006 | Heber ................ | 705/27 |
| 2007/0061412 A1 | 3/2007 | Karidi et al. | |
| 2008/0319950 A1 * | 12/2008 | Lasa ................ | G06F 17/30899 |
| 2009/0019386 A1 | 1/2009 | Sweetland et al. | |
| 2009/0177975 A1 | 7/2009 | Elgar et al. | |
| 2011/0029516 A1 * | 2/2011 | Chang et al. ........ | 707/734 |
| 2011/0107243 A1 * | 5/2011 | Jain .................. | G06F 17/30997 715/762 |
| 2011/0296309 A1 * | 12/2011 | Ngan ................ | 715/734 |
| 2012/0204095 A1 | 8/2012 | Geo et al. | |
| 2012/0290920 A1 * | 11/2012 | Crossley ............ | G06F 8/38 715/234 |
| 2013/0086496 A1 | 4/2013 | Baram et al. | |
| 2013/0198659 A1 * | 8/2013 | Swider et al. ........ | 715/760 |
| 2014/0013212 A1 * | 1/2014 | Von Haden et al. ...... | 715/243 |
| 2014/0026037 A1 * | 1/2014 | Garb ................ | G06F 17/30893 715/235 |

(Continued)

OTHER PUBLICATIONS

"Editing your website with Microsoft FrontPage 2003", retrieved from https://web.archive.org/web/20100807070543/http://iws2.collin.edu/tlc/tutorials/FrontPage_2003_Edit.html.*

(Continued)

*Primary Examiner* — Stephen S Hong
*Assistant Examiner* — Sanchita Roy
(74) *Attorney, Agent, or Firm* — Pillsbury Winthrop Shaw Pittman LLP

(57) ABSTRACT

A method to design a web page, the method including comparing a design pattern of a web page of a certain category with a corresponding design pattern of a plurality of web pages in a same category as the web page, modifying the design pattern of the web page based upon the comparing; and providing information to display the web page with the modified design pattern. A method to design a web page, the method including maintaining a plurality of design patterns for a plurality of web pages in a plurality of categories, receiving a design pattern of a web page of a certain category, providing a recommendation of design patterns of web pages in the same category as the received web page, receiving a selection of a design pattern from the recommended design patterns, and modifying the design pattern of the received web page based upon the selection.

26 Claims, 3 Drawing Sheets

(56) References Cited

U.S. PATENT DOCUMENTS

2014/0325374 A1* 10/2014 Dabrowski ............. G06F 3/048
　　　　　　　　　　　　　　　　　　　　　715/744
2015/0161259 A1*　6/2015 Bejerasco ......... G06F 17/30867
　　　　　　　　　　　　　　　　　　　　　707/706

OTHER PUBLICATIONS

Satyanarayan, A., et al., "A Platform for Large-Scale Machine Learning on Web Design," CHI'12, May 5-10, 2012, 6 pages.
Kaur, S., et al., "An Automated Tool for Web Site Evaluation," (IJCSIT) International Journal of Computer Science and Information Technologies, vol. 3 (3), 2012, pp. 4310-4313. 4 pages.

* cited by examiner

WEB PAGE DESIGN SCANNER

BACKGROUND

Conventionally, web pages have a design pattern that is presented to a user (e.g., layout and color theme). The design pattern for a web page may be obtained or specified using various tools and languages (e.g., Cascading Style Sheets (CSS)) to provide basic layout information for that web page.

BRIEF SUMMARY

There is a need, for example, for a web page scanner to scan a web page's design pattern, e.g., layout and color theme, and then provide possible suggestions or recommendations to improve the design.

There is provided, for example, a method of web page design, the method comprising: comparing, at a computing device, a design pattern of a web page with a corresponding design pattern of a plurality of web pages in a same category as the web page; and modifying the design pattern of the web page based upon the comparing to create a modified design pattern of the web page.

There is provided, for example, a method of web page design, the method comprising: providing, by a computing device, a recommendation of a design pattern of a plurality of web pages in the same category as a web page; receiving a selection of a recommended design pattern from the recommended design patterns; and modifying a design pattern of the web page based upon the selection.

There is provided, for example, a method of web page analysis, the method comprising: receiving a plurality of web pages from the Internet, each web page having a plurality of layout components; and analyzing the layout components of each web page of the plurality of web pages to form a design pattern for each web page.

There is provided, for example, a computer program product comprising: a non-transitory computer readable storage medium comprising computer-readable program code embodied therewith for web page design, the computer readable program code comprising: computer readable program code configured to compare, at a computing device, a design pattern of a web page with a corresponding design pattern of a plurality of web pages in a same category as the web page; and computer readable program code configured to modify the design pattern of the web page based upon the comparing to create a modified design pattern of the web page.

There is provided, for example, a computer program product comprising: a non-transitory computer readable storage medium comprising computer-readable program code embodied therewith to design a web page, the computer readable program code comprising: computer readable program code configured to provide, by a computing device, a recommendation of a design pattern of a plurality of web pages in the same category as a web page; computer readable program code configured to receive a selection of a recommended design pattern from the recommended design patterns; and computer readable program code configured to modify a design pattern of the web page based upon the selection.

There is provided, for example, a computer program product comprising: a non-transitory computer readable storage medium comprising computer-readable program code embodied therewith for web page analysis, the computer readable program code comprising: computer readable program code configured to receive a plurality of web pages from the Internet, each web page having a plurality of layout components; and computer readable program code configured to analyze the layout components of each web page of the plurality of web pages to form a design pattern for each web page.

There is provided, for example, a computing device for web page design, the client device comprising: a processor configured to: compare a design pattern of a web page with a corresponding design pattern of a plurality of web pages in a same category as the web page; and modify the design pattern of the web page based upon the comparing to create a modified design pattern of the web page.

There is provided, for example, a computer device for web page design, the server device comprising: a processor configured to: maintain a plurality of design patterns for a plurality of web pages in a plurality of categories; receive a design pattern of a web page of a certain category; provide a recommendation of design patterns of web pages in the same category as the received web page; receive a selection of a design pattern from the recommended design patterns; and modify the design pattern of the received web page based upon the selection.

There is provided, for example, a computer device for web page analysis, the server device comprising: a processor configured to: receive a plurality of web pages from the Internet, each web page having a plurality of layout components; and analyze the layout components of each web page of the plurality of web pages to form a design pattern for each web page.

Various other objects, features, and advantages of the embodiments will be apparent through the detailed description and the drawings attached hereto. It is also to be understood that both the foregoing summary and the following detailed description are exemplary and not restrictive of the scope of the invention.

DETAILED DESCRIPTION

As discussed above, existing web page tools can perform a code level security scan and/or a code level static analysis of a web page. There is a desire, for example, for a web page scanner to scan a web page's design pattern, e.g., layout and color theme, and then provide a possible suggestion or design template to improve the design (e.g., improve the user-interface (UI)).

Figure 1:
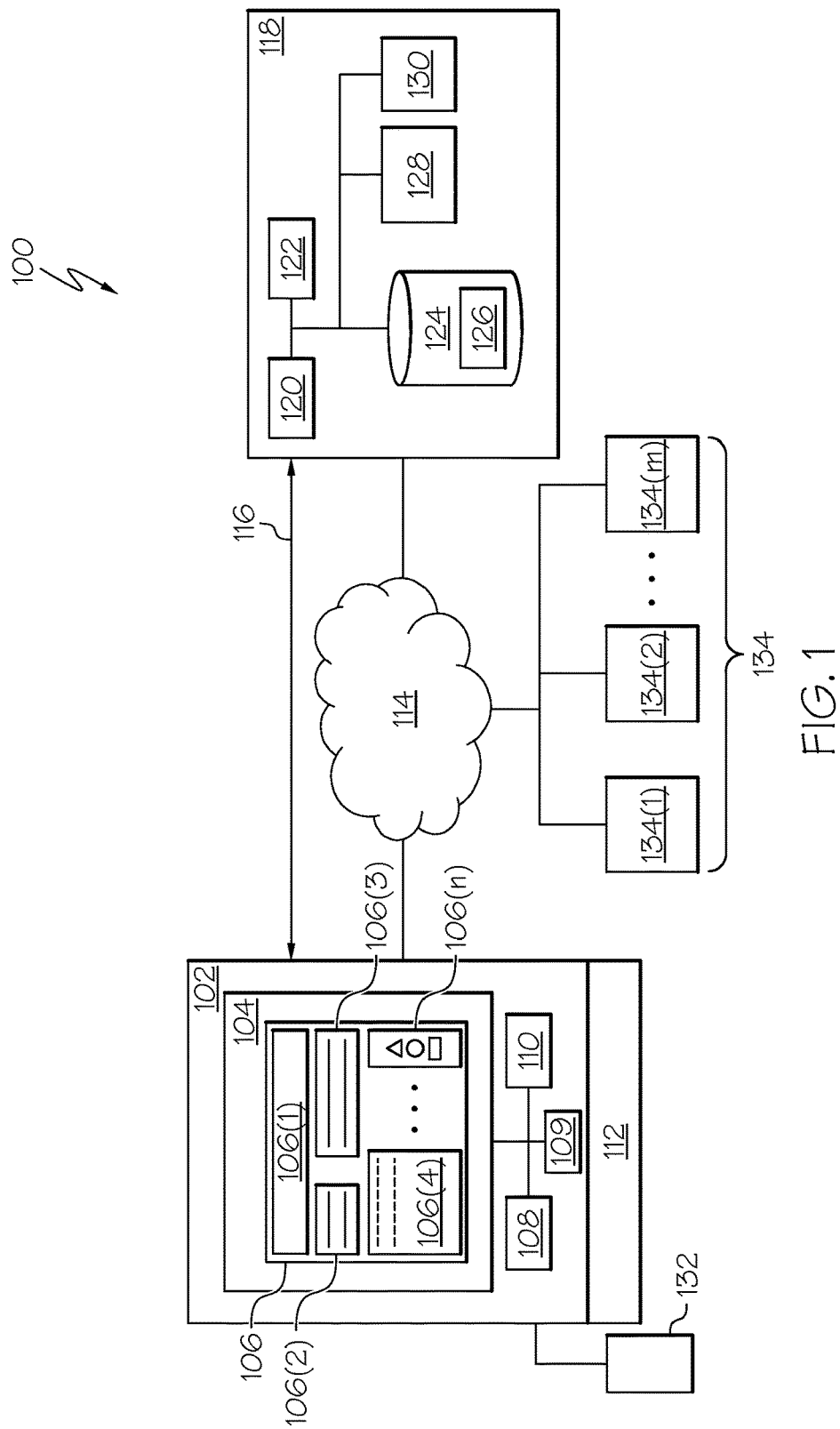
FIG. 1 is an illustration of a system to design and optimize the design of a web page, according to an embodiment.

FIG. 1 illustrates a system 100 to design, and/or optimize the design, of a web page. In an embodiment, system 100 comprises a client computing device 102, a server device 118, a user 132 of the client computing device 102, a network 114, and a plurality of web pages 134 stored on one or more server devices (not shown). In one embodiment, client computing device 102 may be communicably coupled to server devices storing web pages 134.

In one embodiment, client computing device 102 is communicably coupled to server device 118 via network 114 and/or via a communication channel 116. Communication channel 116 provides a direct link between client computing device 102 and server device 118. By way of example only, communication channel 116 may be wired, wireless, optical, magnetic, or combinations thereof, as known in the art. Network 114 may be any type of network, including a local area network (LAN) or a wide area network (WAN), or combinations thereof. In one embodiment, network 114 may enable client computing device 102 and server device 118 to communicate with each other over one or more communication protocols, e.g., IPX/SPX, X.25, AX.25, TCP/IP, or other communication protocols known in the art. In addition, network 114 may enable communication between web pages 134 stored on respective server devices (not shown), client computing device 102, and server device 118 to exchange data.

Client computing device 102 may be a desktop personal computer, a laptop, a mobile computing device, or other computing device that can be operated by user 132. In one embodiment, client computing device 102 comprises a display unit 104, a processor 108, a memory device 110, a web page application module 109, and a user input interface device 112, in addition to other hardware and software.

Display unit 104 may be a computer monitor or a screen, e.g., a liquid crystal display (LCD) screen. Display unit 104 is configured to display a web page 106.

In one embodiment, user 132 creates and designs, or is in a process of creating or designing, web page 106. By way of example only, web page 106 may be created and designed using HyperText Markup Language (HTML), Cascade Style Sheets (CSS), Extensible Markup Language (XML), or other web page design language or tool known in the art. Web page 106 may be displayed using a web browser, e.g., the EXPLORER® browser provided by Microsoft Corporation of Redmond, Wash. In one embodiment, web page 106 comprises web page components 106(1)-106(n), 'n' being an integer. Generally, the design parameters associated with the web page components 106(1)-106(n) that present the "look and feel" of web page 106 make up a design pattern for web page 106. By way of example only, such parameters may be a layout, a color theme, a font type, a font size, a margin width, and/or other visual aspects of web page 106. In one embodiment, such design parameters may be individually associated with each web page component 106(1)-106(n). For example, web page component 106(1) may be a header field of a certain width, web page component 106(2) may be a text box for user 132 to enter information in a certain font size, web page component 106(3) may be textual information or content in a certain font color, web page component 106(n) may be a graphic icon comprising one or more images, or a link (e.g., a uniform resource locator (URL)) in a specific color to another web page (e.g., a uniform resource locator (URL)), etc. Such design parameters associated with web page components 106(1)-106(n) may be associated with the layout of web page 106. For example, design parameters may be related to spacing between different web page components 106(1)-106(n), or other layout feature of web page 106 (e.g., angle between web page components 106(1)-106(n), or height, width, position, opacity, offset, padding, etc.). On the whole, an aggregate of such design parameters forms the design pattern of web page 106. In one embodiment, the design pattern is associated with a user-interface (UI) of web page 106. UI of web page 106 relates to how user 132 sees and/or interacts with web page 106. For example, the design pattern may result in a user-interface that lets user 132 to input text in a field of web page component (e.g., component 106(1)) in a specific font size, color, or other text properties (e.g., in bold, italics, etc.). By way of example only, the design pattern may include an HTML hierarchy, the CSS styles applied to different web page components 106(1)-106(n), and the like. Web page 106 may be created in an initial design pattern (e.g., layout, color, etc.) to form the UI of web page 106, which initial design pattern is modified according to various embodiments presented herein. Such modification may occur, for example, when a web page designed for a desktop user (e.g., user 132) is to be used by a user of a mobile device with a smaller memory capacity and/or different display size or format.

In one embodiment, web page 106 may have a category associated with it. For example, web page 106 may be categorized as an educational web page, a shopping portal, a corporate portal, a secure banking web page, a blogging web page, a social networking web page, a gaming portal, or other categories of web pages known in the art. In an embodiment, the category is one based on the type of activity/service offered through the web page. In an embodiment, the category may be another characteristic common to various different web pages. Each such category may have a particular design pattern associated therewith. Accordingly, in one embodiment, respective design patterns of web page components 106(1)-106(n) may depend upon the category of web page 106. For example, a shopping web page may include a large number of graphical icons to display products for sale to user 132. In contrast, a blogging web page may have a design pattern that primarily comprises text elements, and may have few graphical elements, or even no graphical elements.

In one embodiment, the category of web page 106 may be provided by user 132. In one embodiment, processor 108 may determine the category of web page 106, for example, based on a set of rules implemented by web page application module 109, as discussed below. Additionally, this set of rules may be shared with server device 118 over communication channel 116 and/or network 114.

Processor 108 in client computing device 102 is a hardware processor and may be configured to create and design web pages, e.g., web page 106. Processor 108 may execute one or more scripts stored on memory device 110 to carry out creation and design of web pages. Processor 108 may be configured to carry out operations described in FIG. 3 below.

Figure 3:
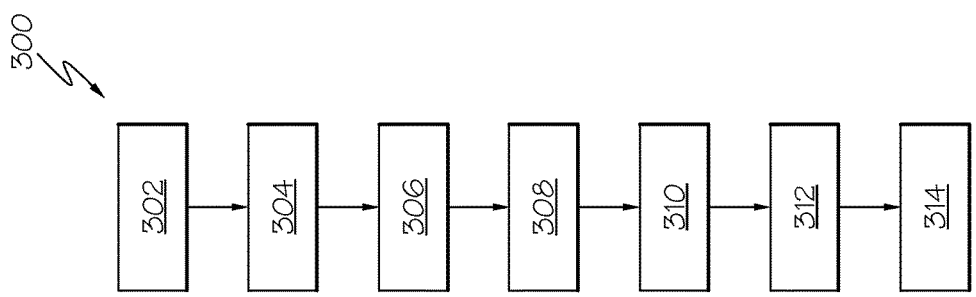
FIG. 3 illustrates an example process of a method to design a web page at a client computing device, according to an embodiment.

Memory device 110 is a hardware device to store computer program code, which when executed by processor 108 causes processor 108 to carry out operations such as illustrated in FIG. 3. By way of example only, memory device 110 may be semiconductor-based, optical, magnetic, electromagnetic, or other forms of memory known in the art. Further, memory device 110 may be random access memory (RAM), read only memory (ROM), or other formats of accessible memory known in the art.

In one embodiment, web page application module 109 may be a software module comprising instructions, code, and a set of rules to be executed by processor 108. In one embodiment, web page application module 109 may be a hardware module, e.g., a Field Programmable Gate Array (FPGA). In one embodiment, web page application module 109 may be located at server device 118.

In one embodiment, web page application module 109 is configured to design web page 106, and/or optimize the design. In one embodiment, web page application module 109 is configured to parse software code that creates web page 106 to determine the category to which web page 106 may belong, if such category is not provided by user 132. Web page application module 109 may be configured to apply a set of rules for a design pattern of individual web page components 106(1)-106(n), two or more web page components among web page components 106(1)-106(n), and/or substantially all of web page 106, to determine a design pattern associated therewith. Web page application module 109 may be used by processor 108 to carry out operations illustrated in FIG. 3. For example, web page application module 109 may be accessed by processor 108 to apply a set of rules that determine which category web page 106 may belong to, to determine various design parameters associated with the design pattern of web page 106 and/or set of web page components 106(1)-106(n), and then optimize those parameters, or make a recommendation to user 132 regarding those parameters. In one embodiment, web page application module 109 includes the set of rules that define the user-interface for web page 106. For example, a web page may use several colors, but the colors may not belong to the same spectrum and/or may not be popular for this category of web page. The system can have an associated rule and recommend to a user a color used by the most popular web pages of the same category. In an additional or alternative example, different countries may have different color preferences, thus the system can have an associated rule and recommend to a user a color for the particular country for which the web page is designed or used. In an additional or alternative example, a rule may enable a recommendation to a user to adjust the padding or margin values based on such values obtained from a most popular web page of the same category. In an additional or alternative example, a layout rule may enable a suggestion to a user to use a DIV HTML tag instead of a TABLE HTML tag because DIV is more flexible in being expanded by CSS.

User input interface device 112 is a device that is configured to let user 132 interact with client computing device 102. In one embodiment, interface device may be a keyboard, a mouse, a gesture-based device, a touch-sensitive electronic surface, or a combination thereof. For example, user input interface device 112 may be configured to allow user 132 to type, select segments of web page 106 (including a set of web page components 106(1)-106(n)), or scroll or display different segments in web page 106, in addition to accessing other data displayed on display unit 104.

User 132 may be a human user, another device (e.g., a robot) programmed to generate or design web page 106, or a software agent in a device to interact with client computing device 102. In one embodiment, user 132 may be part of client computing device 102.

Server device 118 is a hardware device comprising a processor 120, a memory device 122, a database 124, a web render engine module 128, and a pattern analysis module 130, in addition to other hardware and software. In one embodiment, server device 118 may include a web server that may be in hardware or in software to deliver content (e.g., a design pattern) to client computing device 102.

Processor 120 in server device 118 is a hardware processor and may be configured to design web pages, e.g., web page 106. Processor 120 may execute one or more scripts stored on memory device 122 to carry out such creation and design of web pages. In one embodiment, processor 120 may be configured to carry out operations described in FIG. 4 below.

Figure 4:
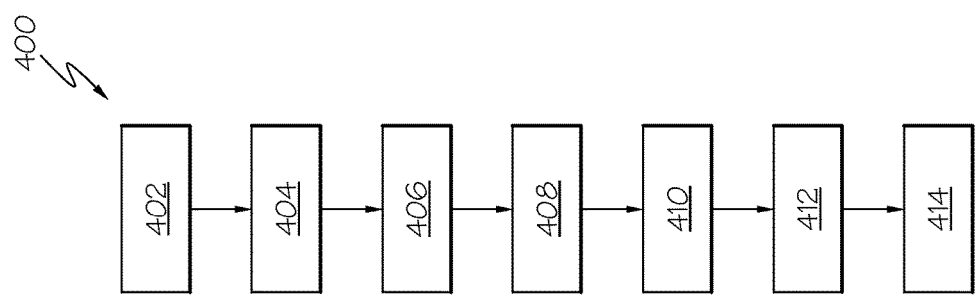
FIG. 4 illustrates an example process of a method to design a web page using a server computing device, according to an embodiment.

Memory device 122 is a hardware device to store computer program code, which when executed by processor 120 causes processor 120 to carry out operations such as illustrated in FIG. 4. By way of example only, memory device 122 may be semiconductor-based, optical, magnetic, electromagnetic, or other forms of memory known in the art. Further, memory device 122 may be random access memory (RAM), read only memory (ROM), or other formats of accessible memory known in the art.

Database 124 is configured to maintain a plurality of design patterns for a plurality of web pages in a plurality of categories. For example, database 124 may maintain parameters associated with design patterns of popular publicly available websites, e.g., www.yahoo.com, www.amazon.com, etc. Such design parameters may include, for example, layout, color theme, or one or more other descriptors for other user-interface related components of websites publicly available over, e.g., network 114 (e.g., web pages 134). In one embodiment, database 124 may be a relational database, or other type of database known in the art. In one embodiment, a structured query language (SQL) may be used by processor 120 to operate and manage database 124. It is to be noted that although database 124 is illustrated inside server device 118, in one embodiment, database 124 may be distributed across different servers, for example in a cloud computing environment, or may be located at computer device 102. Database 124 comprises a repository 126 that stores design patterns associated with various websites. In one embodiment, repository 126 may include design patterns or design templates associated with web pages 134 as a set of web page design patterns 204, as discussed in FIG. 2. Repository 126 may be a part of an internal memory allocated within database 124. In one embodiment, database 124 may be a part of memory device 122.

In one embodiment, web render engine module 128 may be a software module comprising instructions or code to be executed by processor 120, which causes processor 120 to obtain design parameters from one or more web pages in a set of web pages 134. In one embodiment, web render engine module 128 may be a hardware module, e.g., a Field Programmable Gate Array (FPGA), configured to perform operations to obtain design patterns from web pages 134. In one embodiment, web render engine module 128 may be a part of memory device 122 that is accessed by processor 120 to recommend design patterns to user 132, e.g., to modify and optimize the design pattern of web page 106. In one embodiment, web render engine module 128 may comprise software code that analyzes design patterns for web pages 134. In one embodiment, such analysis may involve determining categories to which a web page 134 may belong. Web render engine module 128 may be used by processor 120 to carry out operations illustrated in FIG. 4. For example, web render engine module 128 may be accessed by processor 108 to apply a set of rules that determine which category a web page 134 may belong, and to determine a category for web page 106. In one embodiment, web render engine module 128 may be located at computer device 102. In an embodiment, web render engine module 128 sends one or more requests to a web server and gets web content in response. Web render engine module 128 may then parse, evaluate and execute, for example, JavaScript and/or DOM tree to obtain the full HTML for the web content. For a dynamic or Ajax web page, the web render engine module 128 may capture dynamic content and then provide the final generated HTML content to a pattern analysis module to parse, analyze and abstract the HTML content. For a static web page, it may directly provide the HTML content to the pattern analysis module to process.

In one embodiment, pattern analysis module 130 may be a software module comprising instructions or code to be executed by processor 120, which causes processor 120 to carry out statistical pattern analysis on design patterns of web pages 134. In one embodiment, pattern analysis module 130 may be a hardware module, e.g., a Field Programmable Gate Array (FPGA), configured to carry out statistical pattern analysis on design patterns of web pages 134. In one embodiment, such statistical pattern analysis may be applied to an individual component of each of web page 134(1)-134(m), where 'm' is a positive integer. In one embodiment, pattern analysis module 130 may comprise software to determine categories based upon the results of pattern analysis. In one embodiment, such pattern analysis may be used by processor 120 to generate a popularity index associated with each design pattern in a set of web page design patterns 204 stored in repository 126. Further, such pattern analysis may be carried out globally for all web pages, or for web pages within a particular category. In one embodiment, pattern analysis module 130 may be located at computer device 102. In an implementation of the pattern analysis module 130, the pattern analysis module 130 reads all the HTML content sent from the web render engine module 128 and parses it as a DOM tree. The pattern analysis module 130 also obtains the related CSS file information. After obtaining all necessary information, the pattern analysis module 130 may first recursively extract the width and height properties of the child HTML element(s) until it can construct the layouts of the whole page and each region and then stores this information for recommendation. The pattern analysis module 130 may then parse the DOM tree again to get each element's property values (such as color, padding, margin, etc. values) and corresponding CSS in order to do statistical calculations. After these calculations, the pattern analysis module 130 may store the calculated values as recommendation property values for corresponding HTML elements.

It is to be noted that although one client computing device 102 and one server device 118 are illustrated in FIG. 1, system 100 may comprise additional client computing devices and server devices. Likewise, client computing device 102 and server device 118 may include a plurality of processors and memory devices, and are not limited to only one processor or memory device, as illustrated in FIG. 1. Further, client computing device 102 and/or server device 118 may be configured to simultaneously or otherwise design, or optimize the design, of multiple web pages, in addition to web page 106.

FIG. 3 illustrates an example process 300 of a method to design and optimize the design of web page 106 at client computing device 102, according to one embodiment. It is to be noted that although the embodiments are being described with respect to one web page 106, the operations in process 300 described below may be used for other web pages. In some implementations, process 300 is carried out by one or more processors in client computing device 102, for example, processor 108.

Process 300 may begin in an operation 302. In operation 302, user 132 obtains, creates, or begins to create, web page 106. Operation 302 may be performed by using, for example, an HTML editor executed by processor 108, although other types of web page building tools known in the art may be used. In one embodiment, operation 302 may involve user 132 receiving web page 106 created by an external third party entity.

In an operation 304, processor 108 parses web page 106 to determine a design pattern thereof. For example, processor 108 may determine a layout and a color pattern of web page 106. In one embodiment, processor 108 may determine parameters associated with each web page component 106 (1)-106(n). For example, HTML code associated with web page 106 may be parsed by processor 108 to determine various design parameters such as height, width, spacing, padding, margin, color, font size, font type, and the like associated with web page components 106(1)-106(n) of web page 106. The design parameters may be extracted by processor 108 from the HTML code or the CSS file associated with web page 106, or other code files storing code associated with web page 106. Based upon a determination of such parameters, processor 108 may create a file (not shown) in memory device 110 that describes the design pattern of web page 106 in its current form. In one embodiment, the design pattern may be an aggregate of the design parameters. In one embodiment, the design parameters may be sent to server device 118 over communication channel 116 and/or network 114.

In an operation 306, processor 108 may determine a category of web page 106. In one embodiment, user 132 or other creator of web page 106 may provide such a category to processor 108. In one embodiment, such a category may not be explicitly provided to processor 108 by user 132 or by an external third party creator of web page 106. In this scenario, processor 108 is configured to determine the category by detecting one or more content or user-interface items in web page 106. For example, web page component 106(2) may indicate a list of items for sale, and accordingly, processor 108 may determine that web page 106 is a web page that fits in a shopping/retail web page category. Similarly, for example, web page component 106(3) may have a graphical user-interface icon with text "Buy" on it, which processor 108 detects to be an interactive icon usable by user 132 (e.g., by clicking using a mouse-pointer). Based on such an icon, processor 108 may determine or confirm web page 106 to be in the shopping/retail category. In another example, processor 108 may detect keywords such as "Account information," "Payments," etc., associated commonly with banking web sites. Accordingly, in this example, processor 108 may determine that web page 106 belongs to a banking category. Similar analysis is carried out by processor 108 for other categories of web sites or web pages, e.g., educational web pages, government web pages, corporate web pages, news web pages, social networking web pages, etc.

In an operation 308, processor 108 may obtain data associated with design patterns stored at server device 118 (e.g., in repository 126 of database 124). In one embodiment, processor 108 may filter web page design patterns for only those web pages that are in the same category as web page 106. For example, processor 108 may compare the design pattern of web page 106 with the corresponding design pattern of plurality of web pages 134 stored in repository 126 that are in the same category as web page 106. The comparison may be performed based upon a degree to which the current design pattern of web page 106 matches the design patterns stored in repository 126. For example, processor 108 may allot a count or numerical value to each design parameter that occurs for each web page component 106(1)-106(n). To compare, processor 108 may look at counts or numerical values of design patterns of similar web page components of web pages 134 in the same category. For example, web page 106 may be a search engine web page in which web page component 106(1) may be a search field having a certain height and length, and a certain character input size. Accordingly, processor 108, upon receipt of design patterns from repository 126, may use web page application module 109 to determine what values of height, length, and character input size occur for similar web pages in the same category as web page 106. In addition, processor 108 may receive a popularity index associated with each of those web pages from server device 118, as discussed below with respect to FIG. 2, which indicates how popular each design pattern is among different but similar web pages 134. Based on this comparison, processor 108 may determine how closely the design patterns of different web pages 134 in the same category match web page 106.

Figure 2:
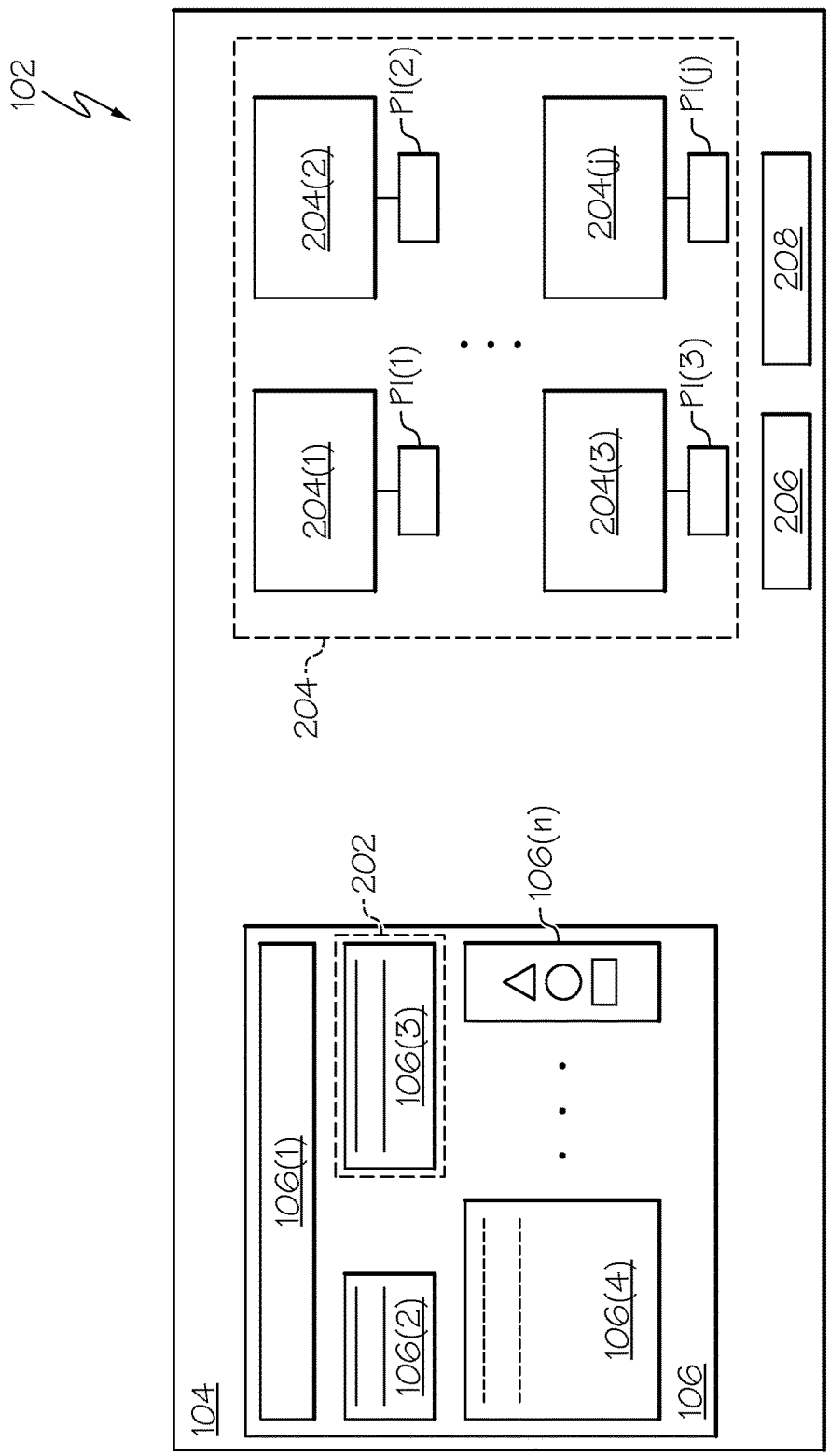
FIG. 2 is an illustration of a recommendation of a web page design pattern, according to an embodiment.

In an operation 310, processor 108 may present set of web page design patterns 204, illustrated in FIG. 2, as a recommendation to user 132 at client computing device 102. For example, display unit 104 may refresh its display to show web page 106 adjacent a set of web page design patterns 204 to user 132. Web page design patterns 204 comprise a presentation of individual web page design patterns 204(1)-204(j), where 'j' is an integer, which are in the same category as web page 106. Each web page design pattern 204(1)-204(j) is associated with a respective popularity index indicator PI(1)-PI(j), interchangeably referred to herein as 'popularity index' in their singular form. Such popularity indices PI(1)-PI(j) may rank each web page design pattern 204(1)-204(j) relative to others in the same category of web pages. For example, the popularity index may be indicated by a series of star shaped graphical icons adjacent each design, although other forms of popularity index representations (e.g., color-coded or number based) may be used. Each star in the series that is highlighted increases the value of the corresponding popularity index. For example, popularity index PI(1) may have four out of five stars that are highlighted, whereas popularity index PI(2) may have three out of five stars that are highlighted, indicating that web page design pattern 204(1) is more popular than web page design pattern 204(2). In one embodiment, web page design patterns 204(1)-204(j) may be arranged as least popular to most popular, or most popular to least popular, based upon a value of respective popularity indices PI(1)-PI(j). For example, a higher value of a popularity index PI(1) relative to a value of popularity index PI(2) may indicate to user 132 that web page design pattern 204(1) is more popular than web page design pattern 204(2). In one embodiment, a set of web page design patterns 204 may be presented based upon a segment 202 of web page 106 selected by user 132. For example, user 132 may select segment 202 including web page component 106(3). Based on this selection, processor 108 may present a set of design patterns 204 that match selected segment 202 only, and not the whole web page 106. Similarly, user 132 may select segment 202 to include more than one web page component (e.g., web page components 106(2) and 106(3)), or even whole web page 106. According to an area encompassed by segment 202, processor 108 may present a corresponding set of web page design patterns 204. In one embodiment, processor 108 may present a set of web page design patterns 204 that only correspond to segments similar to segment 202 from web pages 134. In an embodiment, the corresponding web page design patterns 204 may be of a complete web page having a segment similar to segment 202 or may be of a portion of a complete web page having a segment similar to segment 202, e.g., only showing the similar segment. In one embodiment, a set of web page design patterns 204 may be updated in substantial real-time as user 132 is selecting the area encompassed by segment 202. In such a scenario, different web page design patterns 204(1)-204(j) will appear on display unit 104 based upon the area under segment 202. By way of example only, user 132 may indicate segment 202 on display unit 104 using a mouse-pointer of a mouse device attached to user input interface device 112.

In an operation 312, processor 108 may prompt user 132 to make a selection of a design pattern from a set of web page design patterns 204. Processor 108 may then receive the selection of a web page design pattern that user 132 may wish to apply to web page 106, or to segment 202 of web page 106. In one embodiment, user 132 may perform the selection, for example, by clicking the mouse-pointer over a particular web page design pattern to highlight (or bring to visual prominence) that design pattern. For example, such selection may be performed by user 132 using a mouse-pointer. In this case, the final design pattern of web page 106 will be a new web page design pattern. The new web page design pattern may then be sent to server device 118 for storage in repository 126. In one embodiment, processor 108 may provide user 132 the option to reject all web page design patterns 204(1)-204(j), and instead keep the current design pattern of web page 106.

In an operation 314, processor 108 may record whether or not user triggers an icon 206. For example, icon 206 may show a text label "Preview" on it. Icon 206, when triggered by user 132, causes processor 108 to present a preview of the selected design pattern(s) among web page design patterns 204(1)-204(n). For example, user 132 may select web page design pattern 204(3) to apply to web page 106, or to area under segment 202 on web page 106. Such a preview allows user 132 to determine whether or not the selected web page design pattern is acceptable. Processor 108 may confirm acceptance of the selected design pattern based upon subsequently receiving a selection of an icon 208 from user 132. For example, icon 208 may show a text label "Accept/Confirm Selection" on it. Icon 208 may cause processor 108 to confirm the application of the selected design pattern (e.g., web page design pattern 204(3)) to web page 106, or to area under segment 202 of web page 106. Again, similar to icon 206, such triggering or selection of icon 208 to confirm the selected design pattern may be determined by processor 108 based on mouse input received via user input interface device 112. Upon confirmation by user 132, processor 108 may modify the design pattern of web page 106, or area under segment 202 of web page 106, to reflect the design parameters associated with the selected design pattern in the set of web page design patterns 204. The modification may comprise updating design parameters of web page 106 to be same or substantially the same as the design parameters of the selected web page design pattern. Processor 108 may then store the modified web page 106 in memory device 110, and/or send the modified design pattern of web page 106 to server device 118 for updating repository 126 and storing in database 124.

FIG. 4 illustrates an example process 400 of a method to design and optimize the design of web page 106 using server device 118, according to one embodiment. It is to be noted that although the embodiments are being described with respect to one web page 106, the operations in process 400 described below may be used for other web pages. In some implementations, process 400 is carried out by one or more processors in server device 118, for example, processor 120.

Process 400 may begin in an operation 402. In operation 402, processor 120 obtains a plurality of design patterns for a plurality of web pages (e.g., web pages 134(1)-134(m)) using web render engine module 128. Such design patterns may be obtained by processor 120 by extracting design parameters of a set of web pages 134. These design parameters may be associated with a layout and/or a color theme of a set of web pages 134, and may be extracted, for example, from respective HTML or CSS code thereof by processor 120. Processor 120 may maintain the design patterns of web pages 134(1)-134(*m*) in repository 126 of database 124. In one embodiment, web pages 134(1)-134 (*m*), and their respective design patterns, belong to a plurality of categories. For example, such categories may include, but are not limited to, design patterns or templates for shopping web pages, banking web pages, news web pages, educational web pages, corporate web pages, social networking web pages, and the like. In one embodiment, processor 120 may extract design parameters of individual components of web pages 134(1)-134(*m*) and categorize them. Such categorization of individual components of web pages 134(1)-134(*m*) may be used when the design pattern of segment 202 of web page 106 is being optimized and is modified accordingly, as discussed above with respect to FIGS. 2 and 3.

In an operation 404, processor 120 at server device 118 obtains the current design pattern associated with web page 106 using web render engine module 128. In one embodiment, such design pattern comprises design parameters (e.g., layout and color theme) of individual web page components 106(1)-106(*n*). In one embodiment, processor 120 may parse the code of web page 106 (e.g., in HTML or CSS) to determine a design pattern thereof. In one embodiment, processor 120 may determine parameters associated with each web page component 106(1)-106(*n*). For example, HTML code associated with web page 106 may be parsed by processor 120 to determine various design parameters such as height, width, spacing, padding, margin, color, font size, font type, and the like associated with web page components 106(1)-106(*n*) of web page 106. The design parameters may be extracted by processor 120 from the HTML or CSS code associated with web page 106, or other code associated with web page 106. Based upon a determination of such parameters, processor 120 may create a file (not shown) in memory device 122 or repository 126 that describes the design pattern of web page 106 in its current form. In one embodiment, the design pattern may be an aggregate of the design parameters. In one embodiment, processor 120 may receive the current design parameters associated with the design pattern of web page 106, and/or one or more web page components 106(1)-106(*n*) from processor 108 of client computing device 102.

In an operation 406, processor 120 may determine a category of web page 106. In one embodiment, user 132 or other creator of web page 106 may provide such a category to processor 108 of client computing device 102, which may then forward the category over communication channel 116 or network 114 to processor 120. In one embodiment, such a category may not be explicitly provided. In this scenario, processor 120 is configured to determine the category by detecting one or more content or user-interface items in web page 106. For example, web page component 106(2) may indicate a list of items for sale, and accordingly, processor 120 may determine that web page 106 is a web page that fits in a shopping/retail web page category. Similarly, for example, web page component 106(3) may have a graphical user-interface icon with text "Buy" on it, which processor 120 detects to be an interactive icon usable by user 132 (e.g., by clicking using a mouse-pointer). Based on such content/user-interface item or graphic icon, processor 120 may determine or confirm web page 106 to be in the shopping/retail category. In another example, processor 120 may detect keywords such as "Account information," "Payments," etc., associated commonly with banking web sites. Accordingly, in this example, processor 120 may determine that web page 106 belongs to a banking category. Similar analysis is carried out by processor 120 for other categories of web sites or web pages, e.g., educational web pages, government web pages, corporate web pages, news web pages, social networking web pages, etc.

In an operation 408, processor 120 compares the design pattern of web page 106 with corresponding design patterns of plurality of web pages 134 stored in repository 126 that are in the same category as web page 106. The comparison may be performed based upon a degree to which the current design pattern of web page 106 matches the design patterns stored in repository 126. For example, processor 120 may allot a count or numerical value to each design parameter that occurs for each web page component 106(1)-106(*n*). To compare, processor 120 may look at counts or numerical values of design patterns of similar web page components of web pages 134 in the same category as web page 106. For example, web page 106 may be a search engine web page in which web page component 106(1) may be a search field having a certain height and length, and a certain character input size. Accordingly, processor 120 may determine what values of height, length, and character input size occur for similar web pages in the same category, stored in repository 126, as web page 106. In addition, processor 120 may determine a popularity index associated with each of those web pages, as discussed with respect to FIG. 2. Based on this comparison, processor 120 may determine how closely the design patterns of different web pages 134 in the same category match web page 106. Such comparison is carried out using pattern analysis module 130 to determine one or more matches of the design patterns of web pages 134 to the current design pattern of web page 106. In one embodiment, processor 120 may perform statistical analysis of the stored design patterns in repository 126 using pattern analysis module 130 to determine matches. In an embodiment, the pattern analysis module 130 may parse the entire HTML content and produce the records, composed of component type, design parameter(1) to design parameter(N, where N is an integer), comment, site URL, XPath, etc. For different components, the design parameters may vary and have different meanings to represent different attributes based on the component type. For the page level layout, the scanned results are calculated and categorized into several categories, such as Row Layout, Column Layout, Table Layout, etc. The page level color theme can be generated with the same mechanism as page level layout. For element level patterns, an XPath can be defined for each element as the key and the element attribute values are used as the value. The pattern analysis module 130 may then scan and calculate the statistical value of each key-value pair and store them as patterns into a database. When matching keys, an exact match may be used, which matches the whole XPath, or a fuzzy match may be used, which only considers XPath depth and element name. For the same key, the value frequency may be used as the rank value for a recommendation. So, when a user seeks recommendation, the system may first scan the web page provided by the user and create some key-value pairs based on the scan results. Then for each key, the system may recommend the most popular values (based on the rank value generated before) stored in the database.

In an operation 410, processor 120 may present a set of web page design patterns 204, illustrated in FIG. 2, as a recommendation to user 132 at client computing device 102, based on the comparison and matching carried out in operation 408. For example, processor 120 may send a command signal over communication channel 116 to display unit 104 to refresh its display. The refreshed display on display unit 104 shows web page 106 adjacent a set of web page design patterns 204 provided or presented to user 132. The set of web page design patterns 204 comprises a presentation of individual web page design patterns 204(1)-204(j), where T is an integer, for user 132 to review, consider, and/or select. Each web page design pattern 204(1)-204(j) is associated with a respective popularity index indicator PI(1)-PI(j), interchangeably referred to herein as 'popularity index' in their singular form. Such popularity index indicators PI(1)-PI(j) may rank each web page design pattern 204(1)-204(j) relative to one or more others in the same category of web pages. For example, each popularity index indicator PI(1)-PI(j) may be indicated by a number of star shaped graphical icons adjacent each design, although other forms of popularity index representations (e.g., color-coded or number based) may be used. In one embodiment, web page design patterns 204(1)-204(j) may be arranged as least popular to most popular, or most popular to least popular, based upon a value of respective popularity indices PI(1)-PI(j). For example, a higher value of a popularity index PI(1) relative to a value of popularity index PI(2) may indicate to user 132 that web page design pattern 204(1) is more popular than web page design pattern 204(2). In one embodiment, a set of web page design patterns 204 may be presented based upon a segment 202 of web page 106 received at server device 118 as a selection by user 132. For example, user 132 may select segment 202 including web page component 106(3). Based on this selection, processor 120 may recommend a set of web page design patterns 204 that match selected segment 202 only, and not the whole web page 106. Similarly, user 132 may select segment 202 to include more than one web page component (e.g., web page components 106(2) and 106(3)), or even whole web page 106. According to an area encompassed by segment 202, processor 120 may present a corresponding set of web page design patterns 204. In one embodiment, the set of web page design patterns 204 may be updated in substantial real-time as user 132 is selecting the area encompassed by segment 202. In such a scenario, different web page design patterns 204(1)-204(j) will appear based upon segment 202. By way of example only, user 132 may indicate segment 202 on display unit 104 using a mouse-pointer of a mouse device attached to user input interface device 112.

In an operation 412, processor 120 may receive a selection of a web page design pattern (e.g., web page design pattern 204(1)) in the recommended set of web page design patterns 204 from user 132. Processor 120 may apply the selection to the current design pattern of web page 106, or to the area under segment 202, to modify the current design pattern. In one embodiment, processor 120 may provide a preview of the modified design pattern applied to web page 106, for example, through icon 206 as discussed above. Subsequently, processor 120 may receive a confirmation from user 132 (e.g., through icon 208) that the selected design pattern is acceptable, and stores the selected design pattern in repository 126. However, if user 132 indicates that the selected design pattern is not acceptable, processor 120 resets the applied design pattern of web page 106 to the previous design pattern, and reverts back the changes to the design pattern of web page 106. Selection and preview of a design pattern from web page design patterns 204 by user 132 is carried out using icon 206. If acceptable, processor 120 may receive a confirmation based upon user 132's input to icon 208 that saves the applied selection of design pattern to web page 106, area under segment 202 of web page 106.

In an operation 414, processor 120 is configured to update repository 126 with respect to the selection of the web page design pattern(s) made by user 132. In one embodiment, when user 132 selects one of the recommended web page design patterns 204 to apply to web page 106, processor 120 modifies the popularity index associated with the selected design pattern. For example, if user 132 selects and confirms web page design pattern 204(2) to apply to web page 106 (or, area under segment 202), processor 120 increases a value (e.g., a numerical value) associated with popularity index indicator PI(2). The new value of popularity index indicator PI(2) may be stored in memory device 122 or database 124. Processor 120 is configured to update popularity index indicators PI(1)-PI(j) in a similar manner for other web page design pattern selections made by user 132 and/or other users of various web pages (not shown) that are being created or designed. In one embodiment, when user 132 does not select any of the recommended web page design patterns 204, processor 120 may store the final design pattern of web page 106 saved by user 132 to be a new web page design pattern, and associate a new popularity index indicator therewith. In this case the final web page design pattern of web page 106 is unique. In contrast, when the selected web page design pattern is not new, processor 120 may store an indicator associated with final design pattern of web page 106 as not new or not unique. In one embodiment, update of web page design patterns associated with web pages 134 and/or additional new web pages is carried out by processor 120 by returning to operation 402, as indicated in FIG. 4.

Implementations described in this disclosure may be made in hardware, firmware, middleware, software, or various combinations thereof. The technology disclosed herein may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the technology, and performing certain actions. However, it will be apparent that such descriptions are merely for convenience, and that such actions may in fact result from computing devices, processors, controllers, or other devices executing firmware, software, routines or instructions. Further, the term "web page," in its singular or plural form relates to a particular section of a website. In some embodiments, that website may have only one web page, in which case the web page is the entirety of the website. In other embodiments, a website may contain a plurality of web pages that present information to user 132 over a user-interface on, e.g., display unit 104.

The systems described herein are exemplary system configurations. Other configurations may exist. Those having skill in the art will appreciate that the disclosure herein may work with various configurations. Accordingly, more or less of the aforementioned system components may be used and/or combined in various embodiments. Furthermore, various operations of the methods described herein, while described in a particular order, may be performed in different orders as would be appreciated by those having skill in the art. In some embodiments, more of less of the described operations may be used.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, style sheet language such as Cascade Style Sheets (CSS), or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Other implementations, uses, and advantages of the disclosed technology will be apparent to those skilled in the art from consideration of the specification and practice of the disclosure herein. The specification should be considered exemplary only, and the scope of the technology disclosed herein is accordingly intended to be limited only by any associated claims.

What is claimed is:

1. A method of programmatically assisting with web page design based on programmatically determined patterns in web page design in other web pages, the method comprising:
   obtaining, by one or more computing devices, design patterns of a plurality of web pages in a plurality of categories, each of the design patterns being implemented in at least a respective subset of the plurality of webpages, wherein:
      the design patterns are based on values of design parameters of web page components of the respective subsets of web pages, and the design patterns of the plurality of web pages in the plurality of categories are formed by operations comprising:
         requesting, via the Internet, from publicly available web sites, web content of the plurality of web pages;
         receiving, via the Internet, the requested web content, received web content including both hypertext markup language content and scripting language content;
         executing at least some of the web content, including the scripting language content, to form document object model (DOM) trees of the plurality of web pages; and
         recursively extracting design parameter values of web page components from the DOM trees;
      the design patterns are associated in memory with respective categories, among the plurality of categories, of respective web pages, among the plurality of web pages, in which respective design patterns are applied, and
      the design patterns indicate statistical patterns of values of design parameters of web pages in respective categories among the plurality of categories;
   determining, by one or more computing devices, a category of a web page of interest;
   identifying a plurality of web page components of the web page of interest;
   comparing, by one or more computing devices, a design pattern of the web page of interest with corresponding design patterns of at least some of the plurality of web pages in a same category as the web page of interest;
   determining, by one or more computing devices, recommended values of at least some design parameters of at least some of the identified plurality of web page components based on the comparing and respective statistical patterns indicated by the obtained design patterns representing respective amounts of usage of values of the respective design parameters of the respective components among at least some of the plurality of web pages in the same category as the web page of interest; and
   causing, by one or more computing devices, modification of the design pattern of the web page of interest based upon at least some of the recommended values to create a modified design pattern of the web page of interest that applies the at least some of the recommended values.

2. The method of claim 1, wherein:
   the design parameters include at least three design parameters selected from the following design parameters: color, layout, color theme, font type, font size, margin width, height, width, position, opacity, offset, spacing between different web page components, or padding;
   the components include at least two of header field, text box, images, and links;
   the comparing comprises comparing a value of a design parameter of a component of the web page of interest with a value of a corresponding design parameter of a corresponding component of the plurality of web pages in the same category as the web page of interest; and
   the category is based on a type of service provided by the web page of interest and is at least one selected from a shopping category, a banking category, an education category, a corporate category, a news category or a social networking category.

3. The method of claim 1, wherein the design pattern of the web page of interest is associated with a user-interface of the web page of interest.

4. The method of claim 1, wherein the modifying is performed based upon a recommendation of a design pattern among the plurality of web pages sent to a client computing devices and responsive to an acceptance of the recommendation received from the client computing device, the recommendation being based on pattern analysis of the plurality of web pages.

5. The method of claim 1, wherein the modifying is based upon selecting a design pattern of a most popular web page in the plurality of web pages.

6. The method of claim 1, wherein the recommendation is based upon a popularity index associated with at least some design patterns of the plurality of web pages, the popularity index indicating the most popular to least popular design patterns of the plurality of web pages.

7. The method of claim 1, further comprising:
   providing a preview of the modified design pattern applied to the web page of interest;
   storing the modified design pattern in response to receiving an indication that the preview is accepted by a user of the web page of interest; and
   updating a popularity index of the selected design pattern based upon whether or not the user accepts the modified design pattern.

8. The method of claim 1, wherein:
   identifying a plurality of web page components of the web page of interest comprises scanning the web page of interest and creating key-value pairs in which keys correspond, at least in part, to identified components and values indicate values of design parameters of corresponding components; and
   determining recommended values comprises, for at least some keys of the key-value pairs, recommending respective values for respective design parameters for respective keys based on popularity of usage of the respective values in corresponding components among the respective subsets of webpages implementing corresponding obtained design patterns.

9. The method of claim 8, wherein:
determining recommended values comprises determining corresponding components among the obtained design patterns by matching the created keys to keys in key-value pairs in the obtained design patterns.

10. The method of claim 9, wherein:
at least one match is a fuzzy match based on a path described by a given key.

11. The method of claim 9, wherein:
at least one match is a fuzzy match based on an element name described by at least one key.

12. The method of claim 11, comprising:
providing a preview of the modified design pattern applied to the web page of interest; and
storing the modified design pattern in response to receiving an indication that the preview is accepted by a user of the web page of interest, wherein:
the at fuzzy match is also based on both XPath depth and the element name described by the at least one key; and
forming the design patterns of the plurality of web pages in the plurality of categories further comprises determining statistics indicative of frequency of usage of the design parameter values among subsets of the plurality of web pages from the extracted design parameter values.

13. The method of claim 1, comprising:
receiving a selection of a web page component that is in a modified version of the web page applying the modified design pattern; and
determining updated recommended values of a plurality of design parameters of one or more other web page components based on statistical patterns indicated by a subset of the obtained design patterns corresponding to web pages having web page components that match the selected web page component.

14. The method of claim 1, comprising:
determining a recommended layout based on the comparing and the respective statistical patterns indicated by the obtained design patterns;
determining a recommended web page component in the recommended layout to be included in the web page of interest based on the comparing and the respective statistical patterns indicated by the obtained design patterns; and
determining recommended values of a plurality of design parameters of the recommended web page component based on the comparing and the respective statistical patterns indicated by the obtained design patterns.

15. The method of claim 1, wherein:
the recommended values of at least some design parameters are determined based on a country for which the web page of interest is designed and popularity index scores of at least some of the obtained design patterns.

16. The method of claim 1, comprising:
steps for determining a category of the web page of interest;
steps for statistically analyzing design patterns; and
steps for designing and optimizing design of a web page.

17. A tangible, non-transitory, machine readable medium storing instructions that when executed by one or more processors effectuate operations comprising:
obtaining, by one or more computing devices, design patterns of a plurality of web pages in a plurality of categories, each of the design patterns being implemented in at least a respective subset of the plurality of webpages, wherein:
the design patterns are based on values of design parameters of web page components of the respective subsets of web pages, and the design patterns of the plurality of web pages in the plurality of categories are formed by operations comprising:
requesting, via the Internet, from publicly available web sites, web content of the plurality of web pages;
receiving, via the Internet, the requested web content, received web content including both hypertext markup language content and scripting language content;
executing at least some of the web content, including the scripting language content, to form document object model (DOM) trees of the plurality of web pages; and
recursively extracting design parameter values of web page components from the DOM trees;
the design patterns are associated in memory with respective categories, among the plurality of categories, of respective web pages, among the plurality of web pages, in which respective design patterns are applied, and
the design patterns indicate statistical patterns of values of design parameters of web pages in respective categories among the plurality of categories;
determining, by one or more computing devices, a category of a web page of interest;
identifying a plurality of web page components of the web page of interest;
comparing, by one or more computing devices, a design pattern of the web page of interest with corresponding design patterns of at least some of the plurality of web pages in a same category as the web page of interest;
determining, by one or more computing devices, recommended values of at least some design parameters of at least some of the identified plurality of web page components based on the comparing and respective statistical patterns indicated by the obtained design patterns representing respective amounts of usage of values of the respective design parameters of the respective components among at least some of the plurality of web pages in the same category as the web page of interest; and
causing, by one or more computing devices, modification of the design pattern of the web page of interest based upon at least some of the recommended values to create a modified design pattern of the web page of interest that applies the at least some of the recommended values.

18. The medium of claim 17, wherein:
the design parameters include at least three design parameters selected from the following design parameters: color, layout, color theme, font type, font size, margin width, height, width, position, opacity, offset, spacing between different web page components, or padding;
the components include at least two of header field, text box, images, and links; and
the category is based on a type of service provided by the web page of interest and is at least one selected from a shopping category, a banking category, an education category, a corporate category, a news category or a social networking category.

19. The medium of claim 18, wherein:

identifying a plurality of web page components of the web page of interest comprises scanning the web page of interest and creating key-value pairs in which keys correspond, at least in part, to identified components and values indicate values of design parameters of corresponding components; and determining recommended values comprises, for at least some keys of the key-value pairs, recommending respective values for respective design parameters for respective keys based on usage of the respective values in corresponding components among the respective subsets of webpages implementing corresponding obtained design patterns.

20. The medium of claim 17, wherein:

determining recommended values comprises determining corresponding components among the obtained design patterns by matching the created keys to keys in key-value pairs in the obtained design patterns.

21. The medium of claim 20, wherein:

at least one match is a fuzzy match based on a path described by a given key.

22. The medium of claim 20, wherein:

at least one match is a fuzzy match based on an element name described by at least one key.

23. The medium of claim 17, wherein forming the design patterns of the plurality of web pages in the plurality of categories further comprises:

determining statistics indicative of frequency of usage of the design parameter values among subsets of the plurality of web pages from the extracted design parameter values.

24. The medium of claim 17, the operations comprising:

receiving a selection of a web page component that is in a modified version of the web page applying the modified design pattern; and determining updated recommended values of a plurality of design parameters of one or more other web page components based on statistical patterns indicated by a subset of the obtained design patterns corresponding to web pages having web page components that match the selected web page component.

25. The medium of claim 17, the operations comprising:

determining a recommended layout based on the comparing and the respective statistical patterns indicated by the obtained design patterns;

determining a recommended web page component in the recommended layout to be included in the web page of interest based on the comparing and the respective statistical patterns indicated by the obtained design patterns; and determining recommended values of a plurality of design parameters of the recommended web page component based on the comparing and the respective statistical patterns indicated by the obtained design patterns.

26. The medium of claim 17, wherein:

the recommended values of at least some design parameters are determined based on a country for which the web page of interest is designed and popularity index scores of at least some of the obtained design patterns.

* * * * *